Patented Mar. 31, 1953

2,633,459

UNITED STATES PATENT OFFICE 2,633,459

FLOWABLE MELAMINE RESIN AND DIGUANIDINE CARBONATE

John F. Blais, Norwalk, Conn., assignor to American Cyanamid Company, New York, N. Y., a corporation of Maine No Drawing. Application November 23, 1951, Serial No. 257,979

8 Claims. (Cl. 260—67.6)

This invention relates to resinous compositions and, more particularly, to a resinous composition comprising a melamine-formaldehyde resin and, as a flow promoter therefor, diguanidine carbonate. Still further, this invention relates to resinous compositions comprising melamine-formaldehyde resin and small amounts of diguanidine carbonate used as a buffering flow promoter for the resin with particular application in the field of laminated structures and in industrial and decorative laminates.

One of the objects of the present invention is to improve the flowability of melamine resin compositions and particularly melamine compositions used in laminated structures wherein improved transparency is desired. A further object of the present invention is to make use of diguanidine carbonate as a buffering material in a melamine-formaldehyde resin or melamine-formaldehyde resin solution where the buffering effect will be sufficient to retard the further polymerization of the resinous material so that improved flow of the resin will be enjoyed. These and other objects of the present invention will be discussed more fully hereinbelow.

In the preparation of the compositions of the present invention, one would use a resinous reaction product of melamine with formaldehyde wherein the mol ratio of melamine to formaldehyde is within the range of about 1:1.5 to about 1:3, melamine to formaldehyde, respectively, and preferably a mol ratio of about 1:2, respectively.

The diguanidine carbonate which serves the dual function of a buffering agent and a flow promoter may be used in relatively small amounts such as about 0.025% to about 5% by weight based on the weight of the resin. Whenever color is a factor in the ultimately finished product, one would not wish to use more than about 1% by weight of the diguanidine carbonate. For most practical purposes, one could use about 0.2% to about 0.5% by weight of the diguanidine carbonate as amounts in this range will produce all of the desired improvements with respect to flowability and retardation of cure. Where color is not a factor to be considered, one may use the diguanidine carbonate in amounts greater than 1% up to 5% and even beyond but if the amount of diguanidine carbonate is increased, the water resistance of the ultimate product diminishes or the rate of cure is appreciably diminished.

In using the particular flow promoter of the present invention in melamine resinous compositions, particularly when they are used in laminated structures, there is to be noticed an improvement in the overlay transparency. By virtue of the use of this flow promoter, one may use lower volatiles and lower pressures in the actual laminating operations. Still further, there is the advantage in the fact that there is provided a less critical drying stage. The improved flow of the resin further improves the resin penetration of wood veneers during the pressing operation. Additionally, these other improvements are to be noticed:

1. Improved dimensional stability which means that there will be less warpage and less crazing.
2. There is an improved uniformity of laminate production which serves to minimize or compensate for normal batch variation in melamine resins.

The diguanidine carbonate may be added during or subsequent to the reaction of the melamine with the formaldehyde but preferably after the reaction between the melamine and the formaldehyde has been permitted to proceed until a syrup of the resin is produced. Additionally, the diguanidine carbonate may be added to the resin syrup after said syrup has been prepared and the mixture may be used directly or it may be added to the resin syrup before it is spray dried or the spray dried powder may be redissolved in water or in an aqueous alcohol solution and then used directly. This latter approach namely the addition of the diguanidine carbonate to the redissolved spray dried powder is preferred. Quite obviously, it is not desirable to add the alcohol to the syrup if the syrup is to be subsequently spray dried as the alcohol would be lost in the spray drying operation and that would only serve to increase the cost of the ultimate product.

When the diguanidine carbonate is added to the resin, it is preferably incorporated into an aqueous solution of the resin or into an aqueous alcohol solution of the resin. Thereafter, the modified resin solution may be spray dried, resulting in a dry resinous material containing the diguanidine carbonate dispersed therethrough. If it is desired to use alcohol with the water to prepare the solvent for the resin, one would select one of the monohydric aliphatic alcohols such as methanol, ethanol, propanol, isopropanol, butanol or isobutanol or mixtures thereof. For certain applications, this aqueous alcoholic solution is more desirable than a straight aqueous solution but in other applications it may well be desired to use simply water as the solvent for the resin. The preferred alcohols are ethyl alcohol and isopropyl alcohol. Theoretically, one could make use of aqueous alcoholic solutions containing as much as 60% of alcohol but for practical purposes, one would not wish to use more than about 40% of the alcohol in the alcohol-water solution. Preferably, one would use between about 5-35% of the alcohol in water as the solvent for the resin.

In order that the present invention may be more completely understood, the following example is set forth in which all parts are parts by weight. It should be remembered that any specific enumeration of detail in the following example is by way of illustration only and should not be interpreted as a limitation on the case except as indicated by the appended claims.

Example

To 100 parts of resin A (diluted to about 60% solids in water) there is added 0.12 part of diguanidine carbonate. The resin solution is thoroughly agitated to effect dispersion of the diguanidine carbonate therethrough and the resultant composition is then spray dried by a conventional spray drying step to a solid material. This resinous composition may then be stored, shipped, or prepared for use in laminating operation by redispersing the resinous material in water or in an alcohol aqueous solution of the type described hereinabove.

When the resinous composition has been redispersed in the water or aqueous alcohol solution, it is then suitable for use in conventional laminating operations.

Preparation of resin A 1850 parts of formalin (37% formaldehyde) and 1390 parts of melamine are charged into a suitable reaction vessel provided with an agitator and a reflux condenser. The pH of the mixture is adjusted to 7 with sodium hydroxide and the mixture is then heated to reflux, approximately 94° C. Thirty minutes after reaching reflux, the mixture is cooled to 75° C. and the pH is adjusted to 10 with sodium hydroxide. About 10 parts of a filter-aid are added and the mixture is filtered.

For certain effects, one may wish to make use of various additives such as pigments, dyes and other colorants or reinforcing materials in the nature of glass fibers, asbestos fibers and synthetic resinous fibers and the like.

Although it has been indicated hereinabove that the resinous composition in the syrup form may be spray dried to produce a powdered material, one could make use of other conventional drying steps such as the kettle drying step or the tray drying step. The drying step is only necessary when one wishes to obtain the greater stability required to store the resinous composition or to ship the composition. Wherever one wishes to make use of the resinous composition in a laminating operation immediately after the preparation of said resinous composition one could eliminate the drying step.

Although catalysts could be used in the composition of the present invention, they are not desirable as they would defeat the purposes of using diguanidine carbonate. It has been pointed out hereinabove that the diguanidine carbonate retards the further polymerization of the melamine resin and by accomplishing that it serves to improve the flowability of the resin. If one were to incorporate a catalyst into the resinous syrup, one would overcome this retardation and in fact would accelerate the polymerization which, in turn, would serve to diminish the period of time during which the flow of the resinous composition would continue.

The concentration of resin solids in solution will vary considerably depending on the particular type of application to which the resin solution is being put. For instance, if one is using the resin solution to prepare core stocks, one would want a rather low concentration of resin solids in solution such as about 20% by weight based on the total weight of the solution. This would give a low resin pick-up in the core stocks. Where a high resin pick-up is desired, one would use resin concentrations in the order of about 70% solids but for most applications in preparation of conventional laminates, one would use about 50% solids solutions.

I claim:

1. A composition of matter comprising a melamine-formaldehyde resin and 0.025%-5% by weight, based on the weight of the resin, of diguanidine carbonate, wherein the mol ratio of melamine to formaldehyde is between about 1:1.5 and 1:3, respectively.

2. A composition of matter comprising a melamine-formaldehyde resin and 0.2-1% by weight, based on the weight of the resin, of diguanidine carbonate, wherein the mol ratio of melamine to formaldehyde is between about 1:1.5 and 1:3, respectively.

3. A composition of matter comprising a melamine-formaldehyde resin and 0.025-5% by weight, based on the weight of the resin, of diguanidine carbonate, wherein the mol ratio of melamine to formaldehyde is about 1:2, respectively.

4. A composition of matter comprising a melamine-formaldehyde resin and 0.2-1% by weight, based on the weight of the resin, of diguanidine carbonate, wherein the mol ratio of melamine to formaldehyde is about 1:2, respectively.

5. A composition of matter comprising a melamine-formaldehyde resin solution and 0.025-5% by weight, based on the weight of the resin solids, of diguanidine carbonate wherein the mol ratio of melamine to formaldehyde is between about 1:1.5 and 1:3, respectively.

6. A composition of matter comprising a melamine-formaldehyde resin solution and 0.2%-1% by weight, based on the weight of the resin solids, of diguanidine carbonate wherein the mol ratio of melamine to formaldehyde is between about 1:1.5 and 1:3, respectively.

7. A composition of matter comprising a melamine-formaldehyde resin solution and 0.025% by weight, based on the weight of the resin solids, of diguanidine carbonate wherein the mol ratio of melamine to formaldehyde is about 1:2, respectively.

8. A composition of matter comprising a melamine-formaldehyde resin solution and 0.2%-1% by weight, based on the weight of the resin solids, of diguanidine carbonate wherein the mol ratio of melamine to formaldehyde is about 1:2, respectively.

JOHN F. BLAIS.

REFERENCES CITED

The following references are of record in the file of this patent:

FOREIGN PATENTS

| Number | Country | Date |
| --- | --- | --- |
| 993,874 | France | July 25, 1951 |